(54) PROCESS FOR THE REMOVAL OF SKINS FROM TOMATOES USING THERMOPHYSICAL METHODS

[75] Inventor: Camillo Catelli, Parma, Italy

[73] Assignee: Rossi & Catelli S.p.A., Italy

[21] Appl. No.: 843,993

[22] Filed: Mar. 25, 1986

[30] Foreign Application Priority Data

Apr. 4, 1985 [IT] Italy .............................. 40035 A/85

[51] Int. Cl.$^4$ .............................................. A23L 1/00
[52] U.S. Cl. .................................. 426/481; 426/482; 426/511
[58] Field of Search ...................... 426/481, 482, 511; 99/516, 540

[56] References Cited

U.S. PATENT DOCUMENTS 2,092,729  9/1937  Eberts ................................ 426/481
3,959,506  5/1976  Kunz ................................. 426/511

Primary Examiner—George Yeung
Attorney, Agent, or Firm—Darby & Darby

[57] ABSTRACT

The invention relates to a process and plant for skinning tomatoes using thermophysical methods. The process consists substantially in scalding the tomatoes in a pressurized environment, then inducing sudden depressurization of the tomatoes by bringing them into contact with tomato juice supplied at a lower temperature, whereupon the skinned tomatoes are separated from the juice. The skinned tomatoes proceed to the next stage of the process, and the juice is conveyed likewise to a further processing step, say, concentration. Plant for implementation of the process comprises a pressure vessel (2) into which tomatoes are conveyed, and from which they exit by way of an outlet valve (3); also, a pump (4) which forces condensation-inducing tomato juice into the outlet valve, and plumbing downstream of the valve which permits of conveying the juice to other processing media.

2 Claims, 1 Drawing Figure

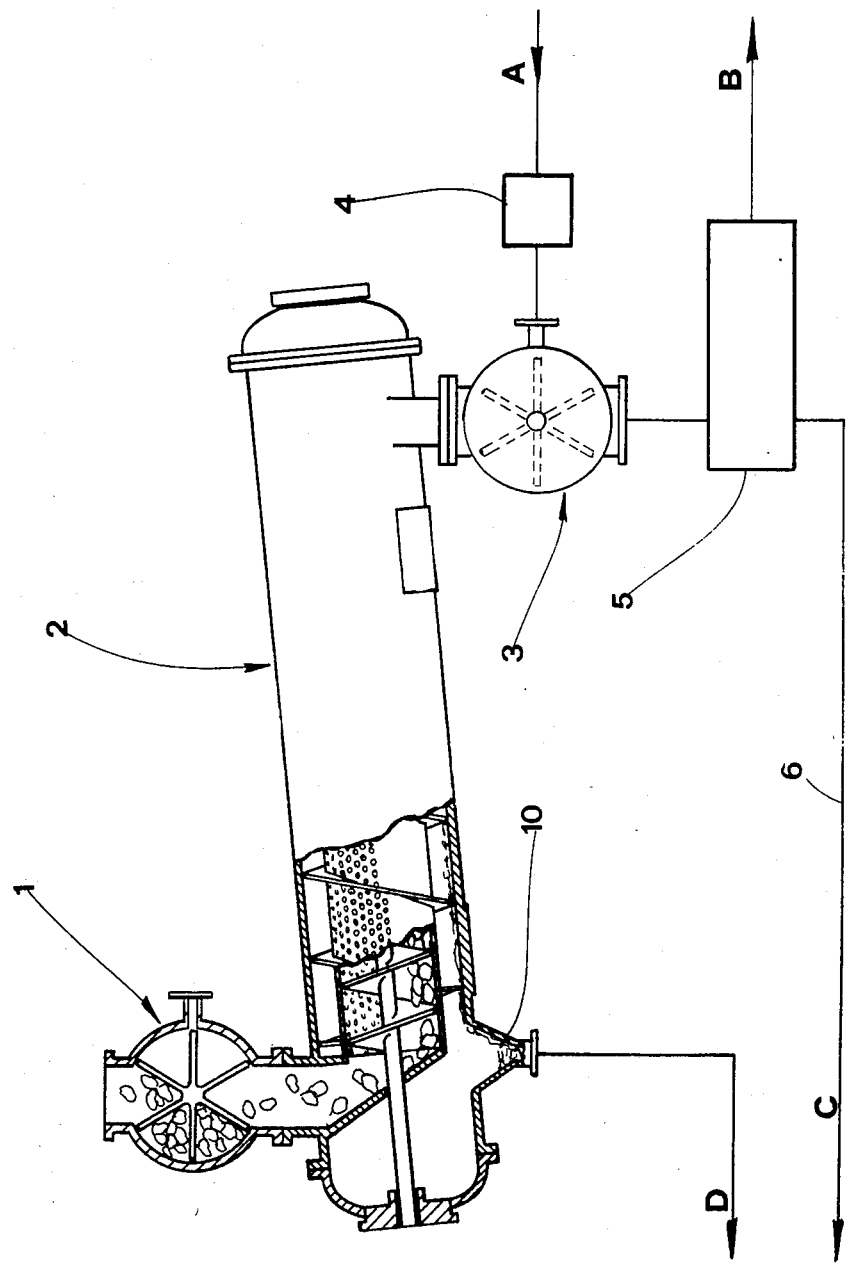

PROCESS FOR THE REMOVAL OF SKINS FROM TOMATOES USING THERMOPHYSICAL METHODS

BACKGROUND of the INVENTION

The invention described herein relates to a process for removal of the skins from tomatoes using thermophysical methods, and to a plant for its implementation. A process using thermophysical methods has already been in use on an industrial scale for some time; in such a process, the surface of the tomato is scalded by steam, whereupon the tomato itself is subjected to sudden depressurization. The sharp drop in pressure induces rapid formation of vapor under the skin of the tomato, the upshot of which is that the skin separates from the tomato pulp.

The process outlined above is implemented by conveying tomatoes into a pressure vessel; saturated steam is then directed into the vessel and brought thus into contact with the outer surface of the tomatoes. The tomatoes are generally drawn off from the vessel by way of a revolving gate valve.

Sudden depressurization in such a process is brought about conventionally by pumping cold water into one of the sectors of the revolving gate valve, thereby inducing rapid condensation of steam circulating in the space not occupied by the tomatoes, and occasioning a sharp drop in pressure.

Utilization of the process thus described is well justified by its marked simplicity and ease-of-operation; nonetheless, there are serious drawbacks. First and foremost, the introduction of water such as to make contact with the tomatoes signifies washing of the produce, resulting not only in a decline in quality of the endproduct, but also in a loss of process efficiency. Second, the process calls for abundant supplies of water, which may not always be readily available in the warm season when tomatoes are processed. Third, and by no means of least importance, one is confronted with the difficulty of disposing of a large amount of liquid waste having a high content of organic matter; this implies complex and costly water treatment systems.

The main object of the invention is that of overcoming the drawbacks mentioned above, providing a process, and plant for its implementation, which will permit of stepping up both quality of the endproduct, and efficiency of the process; the quantity of water consumed in processing, moreover, is substantially reduced, and there is no waste requiring disposal.

An additional object of the invention is that of providing a process which will permit of reducing overall running costs without occasioning excessive increases in capital outlay on the installation of plant.

A marked advantage of the process is that it involves no installation of costly water treatment systems.

SUMMARY of the INVENTION

The stated objects and relative advantages are realized with the process as specified and as claimed hereinafter, which is of the type comprising the steps of scalding the outer surface of tomatoes in a first pressurized environment containing saturated steam supplied under pressure, followed by sudden depressurization of the tomatoes, wherein the step of sudden depressurization is accomplished by bringing the tomatoes into contact with tomato juice supplied at a temperature lower than that of the steam in a second pressurized environment containing tomatoes and steam. The process claimed comprises the further steps of drawing off and separating the skinned tomatoes from the condensation-inducing tomato juice, and of ultimately utilizing the separated juice.

The objects and advantages in question are similarly realized with a plant as specified and as claimed herein, for implementation of the process disclosed, of the type comprising a pressure vessel into which tomatoes are introduced by way of an inlet valve and brought into contact with pressurized steam inside the vessel; and outlet valve by way of which the tomatoes are drawn off from the vessel; and means of depressurization designed to occasion a sudden drop in pressure at a location inside the outlet valve. In a plant according to the invention, the means of depressurization comprise first a pumping means designed to force condensation-inducing tomato juice into the outlet valve. One also has a means of separation located downstream of the outlet valve and designed to separate the skinned tomatoes from the condensation-inducing juice, a first discharge line downstream of the means of separation designed to draw off the separated juice, and further, conventional processing media in receipt of the separated juice from the first discharge line, by means of which such juice is ultimately utilized.

BRIEF DESCRIPTION of the DRAWINGS

The process and plant disclosed above will now be described in detail, by way of example, with reference to the accompanying drawing which provides a schematic representation of the embodiment of such plant.

DESCRIPTION of the PREFERRED EMBODIMENT

The industrial process disclosed features the removal of skins from tomatoes using thermophysical methods. Tomatoes are conveyed into a pressure vessel, and once inside, their outer surface subjected to a scalding action; accordingly, the time that a single tomato remains within the vessel will be calculated such that its surface will be scalded to the requisite depth.

The drawing illustrates a vessel 2 in which the scalding action may take place; such a vessel contains saturated steam supplied under pressure. Tomatoes are conveyed into the vessel by way of an inlet valve 1 with a revolving gate, which admits the tomatoes in such a way as to avoid direct communication between the pressurized environment inside the vessel, and the ambient surroundings.

The vessel 2, which is of conventional type, consists substantially of a pressurized stationary cylindrical chamber inside of which a perforated cylindrical chamber is caused to rotate, and has two conveyor screws that are integral with and turn inside and outside, respectively, of the perforated chamber. Tomatoes fed in through the inlet valve 1 enter the perforated chamber and are conveyed along the axis of the vessel by the inner screw toward an outlet valve 3, likewise having a revolving gate. Steam is conveyed by the outer screw in the opposite direction, together with any tomato juice and fragments that may escape through the chamber perforations, toward a discharge outlet 10. Clearly enough, the scald might be implemented using other suitable types of vessel.

The scalded tomatoes are conveyed into the various fluid-tight sectors of the outlet valve 3, and drawn off from the vessel with continuing rotation of the revolving gate; needless to say, space existing between adjacent tomatoes in a given sector of the valve will be occupied by pressurized steam from the vessel.

As each sector passes in turn through a given point intermediate of the entry and exit points of the outlet valve, it is in receipt of tomato juice supplied via 'A' by first pumping means 4 at a temperature considerably lower than that of the steam occupying the sector; thus, the juice induces rapid condensation of the steam, and with it, a strong depressurizing action the effect of which is to separate the skin of the tomato from the pulp.

With the valve continuing to rotate, sectors are brought one by one around to the exit point, and the skinned tomatoes and condensation-inducing juice are discharged; this constitutes the step of drawing off tomatoes and juice from the vessel.

In the drawing, 5 denotes means of separation located downstream of the outlet valve; such means are of a conventional type, and could be embodied as a flat conveyor with holes that will allow passage of juice, skins and fragments of tomato, though not of the whole skinned tomatoes. The tomatoes are thus separated from the juice, skins and fragments, and conveyed via 'B' to a further processing stage.

Separated juice is conveyed via 'C' through a first discharge line 6 extending downstream from the means of separation 5, toward conventional processing media (not illustrated) by means of which the tomato juice is ultimately utilized, say, by being concentrated.

Condensed liquid issuing from the discharge outlet 10, which contains tomato juice and fragments as aforementioned, is likewise conveyed toward the conventional processing media, via 'D', either with the separated skinning juice, or independently.

Compared to existing thermophysical processes in which water is pumped into the outlet valve 3 in order to induce condensation and bring about sudden depressurization of the tomato, advantages offered by the process disclosed are clearly discernable. First and foremost, the tomatoes are not 'washed' as a result of contact with water, so that quality of the end-product is at once enhanced; second, that part of the juice which in existing processes is discarded together with the condensation-inducing water, is recovered in the process disclosed, and exploited together with the condensation-inducing tomato juice by further processing media. With this in mind, it will be noted that, whilst water in the abundant quantities required is not always readily available, supplies of tomato juice present no such problem, since stocks will always be on hand in the factories where tomatoes are processed.

The recovery of condensed liquids and their ultimate utilization also signifies elimination of waaste, inasmuch as tomato juice and fragments were hitherto discarded; recovery also signifies recovery of heat, since calories are usually present in such condensed liquids at high temperature.

A singular advantage of the process is that it enables total elimination of the costs associated with treatment of waste, inasmuch as liquids which are discharged by the plant are re-used to economic advantage, for example, by subsequent concentration, rather than being discarded. It will be clear, in fact, that by utilizing tomato juice as a medium to induce condensation, recovery of such a medium is made possible, whereas utilization of water as the medium simply creates a discharge of 'tomato-fouled' water, constituting waste which must be treated at great expense in order to avoid serious pollution of the environment, that can result from disposal. What is more, the recovery of condensed liquids totally eliminates any polluting emission from a plant used to implement the thermophysical skinning process.

Lastly, it will be noted that the process and plant disclosed are easily integrated into existing systems, whatever the type.

what is claimed is:

1. Process for the removal of tomato skins using thermophysical methods, comprising the steps of
    scalding the outer surface of tomatoes in a first pressurized environment containing saturated steam supplied under pressure,
    subjecting the scalded tomatoes to sudden depressurization by bringing the scalded tomatoes into contact with tomato juice supplied at a temperature lower than that of the steam, in a second pressurized environment having a pressure lower than the pressure in said first pressurized environment to separate the skins from the tomatoes,
    drawing off the skinned tomatoes, tomatoe juice, tomatoe skins and tomatoe fragments from the second pressurized environment,
    separating the skinned tomatoes from the tomatoe juice, tomatoes skins and tomatoe fragments, and
    recovering the tomatoe juice from the tomatoe skins and tomatoe fragments.

2. Process as in claim 1, additionally comprising the separately implemented step of discharging liquids condensed from steam in the first pressurized environment.

* * * * *